Nov. 4, 1941.   P. H. KNOWLTON ET AL   2,261,584
CONTROL SYSTEM
Filed Aug. 29, 1939    5 Sheets-Sheet 1

Inventors
PAUL H. KNOWLTON AND
PAUL S. DICKEY
By Raymond D. Junkins
Attorney

Nov. 4, 1941.   P. H. KNOWLTON ET AL   2,261,584
CONTROL SYSTEM
Filed Aug. 29, 1939   5 Sheets-Sheet 2

Inventors
PAUL H. KNOWLTON AND
PAUL S. DICKEY
By Raymond W. Jenkins
Attorney

PAUL H. KNOWLTON AND
PAUL S. DICKEY

Patented Nov. 4, 1941

2,261,584

UNITED STATES PATENT OFFICE 2,261,584

CONTROL SYSTEM

Paul H. Knowlton, Schenectady, N. Y., and Paul S. Dickey, Shaker Heights, Ohio, assignors to Bailey Meter Company, a corporation of Delaware Application August 29, 1939, Serial No. 292,541

11 Claims. (Cl. 257—2)

This invention relates to control systems and particularly to a control system for automatically regulating the admission and discharge of a cooling fluid to an elastic fluid condenser of a turbine driven railway locomotive.

Locomotives having elastic fluid power plants and designed for extended service generally are provided with an adequate heat exchange apparatus for purposes of reducing the exhaust pressure of a turbine. Such condensers or heat exchange apparatus are usually cooled by air. The air is generally admitted through side wall openings of the locomotive body adjacent the condenser units and exhausted at the rear of the units through suitable outlets provided in the roof of the locomotive cab structure. Due to differences in atmospheric pressures caused by weather conditions and varying altitudes encountered by a train during a trip and also because of variations in speed, regulation must be had of the cooling air admitted in accordance with the changing operating conditions to properly maintain the desired functioning of the heat exchange apparatus.

It is an object of our invention to provide a control apparatus for adjustable louvres or dampers whereby the volume of air flowing through the heat exchange apparatus may be automatically regulated to a desired degree in accordance with varying requirements.

It is a further object to obtain such control by simultaneously properly regulating the inlet and exhaust louvres.

These and other objects of our invention are attained by the illustrated specification, in which.

Figure 1:
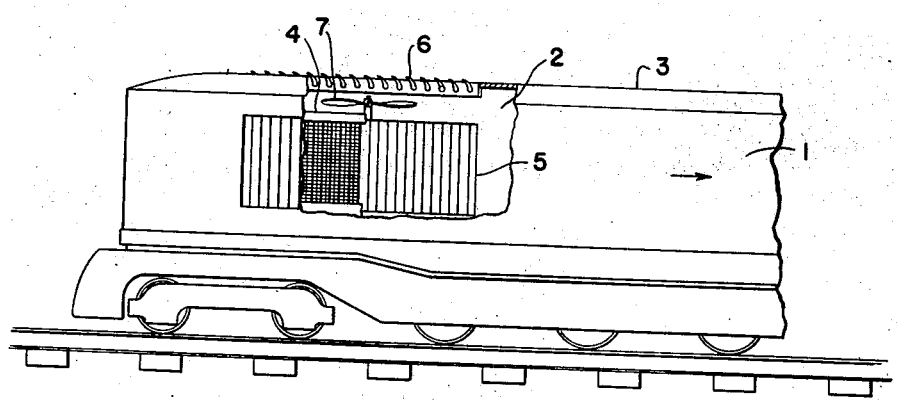
Fig. 1 is a side view, partly in section, of a railway locomotive provided with a system of louvres to be controlled.

Referring to Fig. 1 of the drawings, we show therein a locomotive section embodying a heat exchanger compartment. The locomotive comprises a vehicle of side walls 1, 2 and a roof 3. Adjacent the opposite side walls of the compartment and interiorly are mounted suitable condenser or heat exchanger units 4. The side walls are equipped with suitable openings adjacent the condenser units. These openings have a plurality of louvre blades 5 mounted therein for purposes of controlling the admission of cooling air to the condenser units. The cooling air coming from the exterior of the vehicle walls, after passing through the condenser units, is diverted upward through an opening in the roof 3 having also a plurality of louvre blades 6 transversely mounted. It is not essential to our invention, however we prefer to employ a condenser fan 7 suitably mounted adjacent the discharge louvres in the upper portion of the compartment. The condenser fan may be driven by any suitable means such as a steam turbine or engine.

Figure 3:
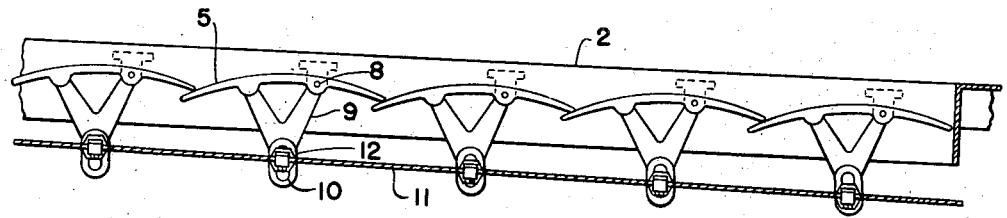
Fig. 3 is a plan view of the inlet louvres in a closed position.
Figure 4:
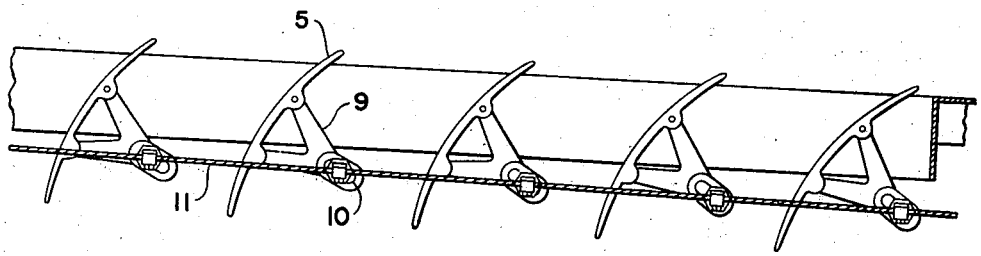
Fig. 4 is a plan view of the inlet louvres in an opened position.
Figure 2:
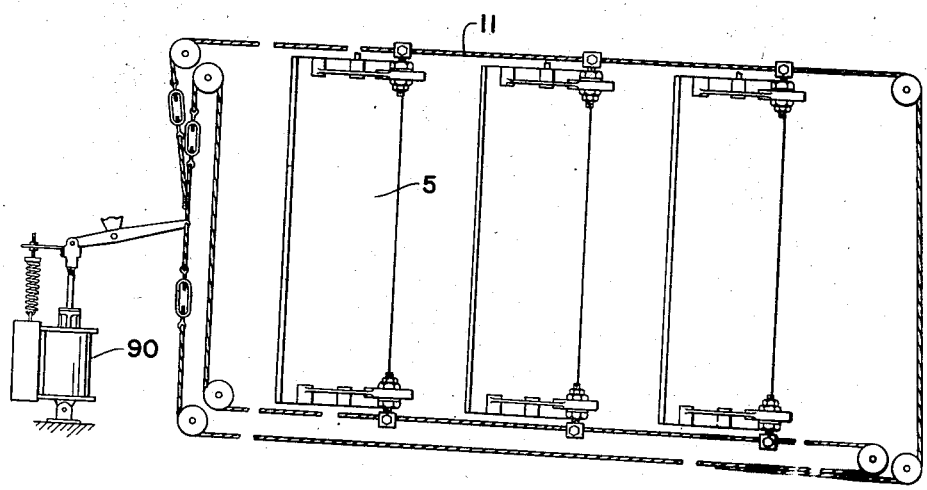
Fig. 2 is an elevational view of a controlled assembly of louvre blades.

The preferred type of louvre blades 5 to be controlled is generally shown in Figs. 2 to 4, inclusive, although our invention may be applicable to other types. Briefly, the louvre blades are shown adapted to be vertically located and pivotally mounted in the side wall openings. They are preferably made of lightweight metal, are arcuate in the transverse section and suitably curved so as to offer a minimum resistance to the flow of air therethrough. With reference to Fig. 3, the louvres 5 connectively pivot about pins 8 fixed to the side wall 2 and are spaced apart a distance such that upon closing they slightly overlap each other. The position of the louvre blades 5, with respect to the side walls of the locomotive, is controlled through bifurcated arms 9 extending perpendicularly from the inner surface of the blades. The ends of the arms 9 are provided with elongated slots 10 into which control rods or cables 11 may be adjustably secured through a clamping means 12. Thus a force exerted upon the cable or control rod 11 will tend to move the entire group of louvres in unison. Their position in the locomotive side wall is such as to always present their inner surfaces, when opened, to scoop and divert the air inwardly to the condensers. Provision is further made for progressively varying the degree of opening of respective blades of the assembly in response to a predetermined movement of the control cables so as to insure a uniform flow of air the entire length of the opening. Such adjustment, as shown in Fig. 4 where the successive edges of the individual louvres protrude slightly further outwardly, is necessary, particularly when the locomotive is traveling at high speed and when the air flow is substantially parallel with the side walls of the locomotive. If the edges of the blades, beyond the first, did not project slightly outwardly and progressively to the end, then the first few blades would carry a maximum supply of air while those blades toward the rear practically none. Such an unequal distribution of air flow to the heat exchanger would result in an imperfect functioning of it. To effect this successive and graduated staggering of the blades, the cables 11 are fastened in the slots 10 of the arms 9 in a graduated manner so that the blades toward the front, as shown in Fig. 4, are connected by a longer lever arm than those toward the rear. Such connection will make it possible, through a predetermined movement of the control cable 11, to pivot successive blades from the front to the rear through progressively greater angles and thus project the blades further outwardly and progressively rearwardly, allowing an equal distribution of air to the condensers.

Fig. 2 is an elevation of the inlet louvres showing the preferred arrangement of louvres 5 and actuating cable 11, the latter adapted to be moved by a pneumatic actuator 90 under the control of variables in the operation of the locomotive power plant.

Figure 5:
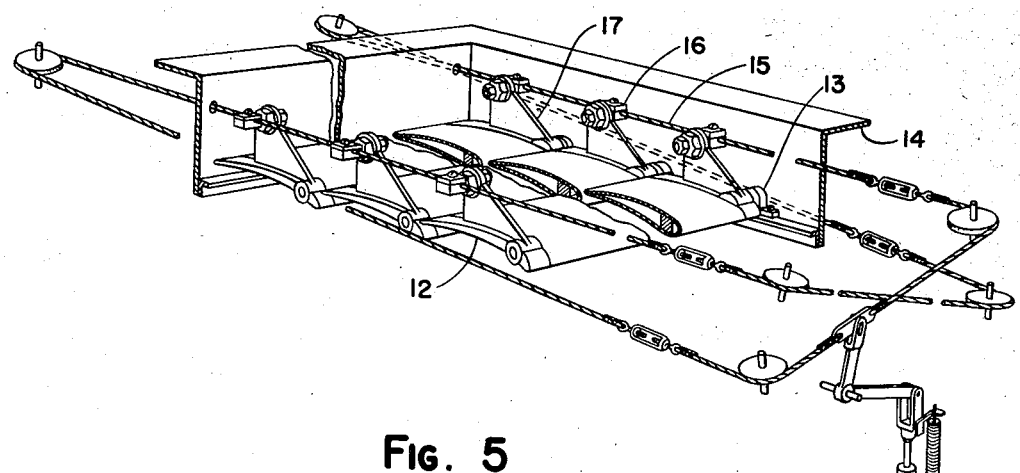
Fig. 5 is a perspective view, partly in section, of the discharge louvres.

The preferred type of discharge louvre positioned in the roof of the heat exchanger compartment of the locomotive is shown in Fig. 5. The construction is somewhat similar to the inlet louvres. Each blade 12 is of arcuate cross-section designed to offer very little resistance to air flow, and is pivoted through proper means 13 to frame members 14. The position of the blades is controlled by similar means to that of the inlet louvres, through a control cable 15 fastened by a suitable clamping means 16 in the arms 17. The control cable passes over convenient pulleys, and is positioned by a power means 18.

In condensing systems designed for locomotive use where space is an essential factor it is a necessary and an efficient operation to return to the steam generator the water of condensation, to reduce the back pressure on the exhaust side of the prime mover, to conserve and return to the steam generator as much heat as possible, and to remove air from the feed water.

Our invention primarily deals with the utilization of a means to effect the best operation of the condenser units through a control system responsive to a condition or conditions such as temperature or pressure of the condensate, the lubricating oil temperature and the speed of the locomotive. More particularly it is intended to control the opening and closing of the louvres automatically to attain highest efficiency of the condensers.

In general our invention contemplates adjusting one or more sets of the louvres in accordance with locomotive speed to obtain the maximum possible natural air circulation around the condenser and then supplementing the circulation so obtained by a suitable fan as may be necessary to maintain the temperature in the condenser between desired limits. In this manner we provide the necessary cooling with minimum power expenditure.

We have found that there is a direct relationship between locomotive speed and the degree of louvre opening which will produce maximum natural air circulation around the condenser. In accordance with our invention we therefore increase the louvre opening in substantially direct proportion to the speed of the locomotive. As will be appreciated, however, due to side winds and varying climatic conditions the amount of air flow so obtained and the amount of cooling air required to maintain the temperature in the condenser between predetermined limits will vary, and in accordance with our invention we therefore supplement the natural air circulation by forced circulation and additionally readjust one portion of the louvres in accordance with the amount of forced circulation supplied. We have found that this arrangement produces the maximum possible efficiency while insuring safe continuous operation. It will be observed that even under severe climatic conditions of abnormally low temperatures the condenser will be protected against freezing for if necessary to maintain the temperature therein within the predetermined limits one set of louvres will entirely close, thereby stopping any circulation whatsoever through the condenser.

It is evident that we may in accordance with our invention adjust the inlet and outlet louvres in accordance with locomotive speed and readjust either the inlet or outlet louvres in accordance with condenser temperature as may be desired; and we will therefore illustrate and describe both modifications of our invention.

The control of condenser temperature is had from variable conditions of the condensate taken at a point in a common header and just before a hot well (not shown). The proper control of condensate temperature, through the cooling of the condensers, will yield the desired back pressure to be maintained in a prime mover. This result can also be attained by controlling the condenser temperature from the pressure of the condensate taken at the same point.

Due to limitation of space on a locomotive it is necessary to combine with the condenser units cooling means for the lubricating oil. Thus as the temperature of the condensers is controlled the oil temperature is likewise controlled. Therefore, the control system must also be responsive to lubricating oil temperatures. The third governing condition for our control system is train speed which of itself varies the air flow through the louvres.

Figure 6:
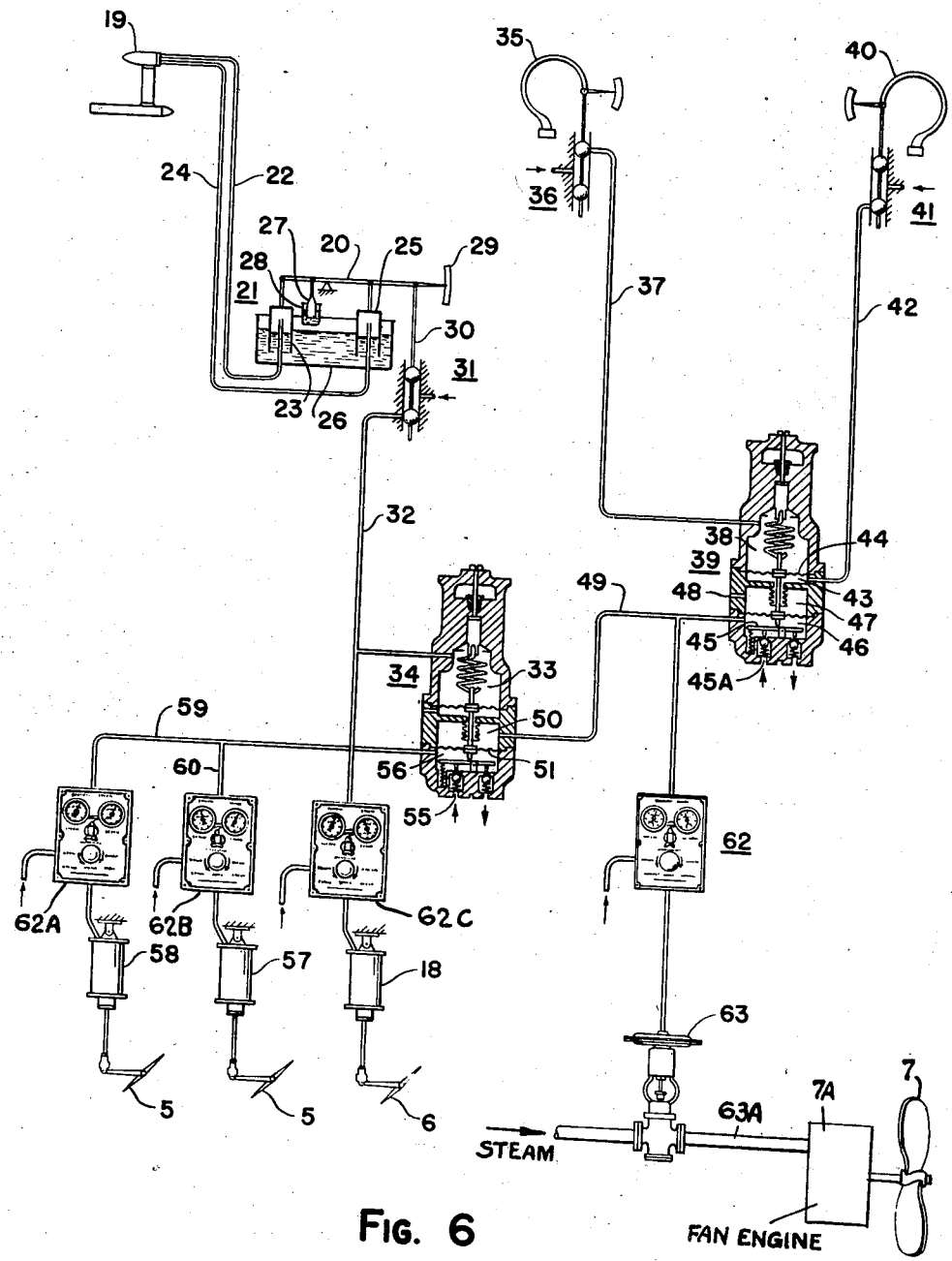
Fig. 6 is a diagrammatic view of the control apparatus, the relay units being shown in section.

Referring with more particularity to a preferred embodiment of the control system, we show in Fig. 6 a conventional air speed indicator 19 of the Pitot tube type which creates a pressure differential representative of train speed. The pressure differential indicator unit 21 may be of construction such that the high pressure line 22 leads beneath an inverted bell 23, the low pressure line 24 to a bell 25, both bells sealed by a liquid held in a container 26. Rotary motion of the bells 23, 25 and beam 20 is retarded by a displacer 27 suspended from arm 20 and dipping into a liquid 28 such as mercury. The unit is properly calibrated to indicate actual locomotive speed, indication of the speed being made through pointer arm 20 moving relative an index 29. To the pointer arm 20 is attached, by link 30, an air pilot valve 31; any movement of the link 30 causing the pilot valve to establish an air loading pressure representative of speed in a piping connection 32 leading to the air actuator 18, which actuator through the motion of its piston will position the outlet louvre blades 6. This same pressure will exist in chamber 33 of relay 34. The particular type of air pilot valve utilized is described in a Patent 2,054,464 issued to C. Johnson.

A Bourdon tube 35 responsive to the temperature of the condensate positions an air pilot valve 36 which governs the air pressure in the piping 37 and chamber 38 of relay 39. Another Bourdon tube 40 positions an air pilot valve 41 in accordance with the temperature of the lubricating oil and said pilot valve governs the air pressure in piping 42 to chamber 43 of relay 39. Thus an increase in lubricating oil temperature will cause Bourdon tube 40 to tend to straighten, moving air pilot valve 41 upward, decreasing the loading pressure in pipe 42 and decreasing the pressure in chamber 43 of relay 39. The pressure in chamber 38 will act on diaphragm 44 causing it to move and, through its motion, increase the pressure on lever 45 increasing the pressure in chamber 46 of relay 39 by admitting air through valve 45A. The lubricating oil temperature controller 40 is adjusted so as to be more sensitive to temperature changes than controller 35. This is to have it predominate in action and slightly later to be modified by the condensate temperature controller 35. Chamber 47 of relay 39 is open to the atmosphere through opening 48 so as to produce no opposition to the expansion or contraction of chambers 46, 43 and 38. A more complete description of such relay 39 may be found in Patent 2,098,913 issued to P. S. Dickey.

The increase in pressure occurring in chamber 46 of relay 39 is transmitted by connecting piping 49 to chamber 50 of relay 34. This increase in pressure of chamber 50 forces diaphragm 51 downward, opening the inlet valve 55 and causing an increase in pressure in chamber 56, which increase is transmitted to actuators 57, 58 through piping 59 and 60 to position the inlet louvres 5. The pressure in chamber 56 is equal to the pressures in chambers 33 and 50 as established by the air controller 21 and Bourdon tubes 35, 40, then any variation in chambers 33, 50 will be met by a resultant variation in chamber 56 altering the position of the actuators.

Conversely, due to a decrease in temperature, Bourdon tube 40 will cause pilot valve 41 to move down, increasing the pressure in chamber 43, decreasing the pressure in chamber 46. If condensate temperature decreases then pilot valve 36 is forced downwardly decreasing the loading pressure to chamber 38. The decrease in pressure in chamber 46 of relay 39 is transmitted to chamber 50 of relay 34, and if the pressure in chamber 33 is less than the pressure in chamber 50, a decrease in chamber 56 will occur, for the sum of the pressures opposing the pressure in 56 is less than in 56 and equalization takes place. The resultant pressure effects a repositioning in a closing direction of inlet louvres 5.

Figure 8:
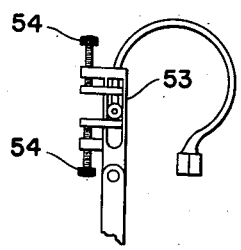
Fig. 8 shows a controller with a lost motion link.

The Bourdon tube 35 (and 40 in similar manner) is connected to the stem of pilot 36 through an adjustable connection 53 as shown in Fig. 8 providing the possibility of lost motion. Pivoted link 53 is provided with a slot in which the free end of Bourdon tube 35 pivots, and has movable stops 54 which may fix the pivot of 35 or may be separated to allow lost motion of 35 before movement of pilot 36 begins in either direction. Under certain conditions of operation it may be desirable that every variation in condensate temperature or in lubricating oil temperature be fully effective in varying the respective loading pressure upon relay 39. At other times it may be desirable to allow some fluctuations in the temperatures without consequent changes in damper position. Under the latter condition the temperature controls would be known as limit controls and become effective only when undesirable limits of temperature are reached.

The pipe line 49 also connects to a selector valve 62 and from there to a diaphragm operated valve 63. In Fig. 6 by way of example we have shown the fan 7 driven by a variable speed engine 7A. Steam is supplied the engine through a conduit 63A from any suitable source (not shown), such for example as the locomotive boiler, and the flow therethrough is controlled by the valve 63, located in an auxiliary steam line leading to a condenser fan engine (not shown). The pressure established in chamber 46 of relay 39 governs the position of the valve 63 and in turn the amount of steam admitted to the condenser fan engine. Valve 63 is so adjusted that during normal operation it remains closed and is opened only due to an extreme condition as represented by predetermined high loading pressure. When such condition arises, as the reaching of a limiting temperature in the condensate or lubricating oil, valve 63 is opened increasing the amount of steam to the condenser fan, increasing its speed. Obviously because we desire to use the maximum natural air circulation around the condenser obtainable by virtue of the motion of the locomotive and supplement that with forced draft circulation only as may be required to maintain the temperature in the condenser below a predetermined value we do not vary the speed of the fan 7 in accordance with locomotive speed. It will be obvious that locomotive speed is not an indication of the amount of cooling air required, for the locomotive may be coasting down a grade at high speed and yet discharging practically no steam to the condenser. If the speed of the fan 7 was maintained proportional to locomotive speed under such a condition vastly more air would be circulated around the condenser than is necessary and the steam supplied the fan 7 would be utterly wasted. Conversely, the locomotive might be moving at slow speed up a steep grade, thereby discharging a maximum amount of steam to the condenser and if the speed of the fan 7 was varied in proportion to locomotive speed insufficient cooling air would be circulated around the condenser. It will be evident that for this reason also it is desirable to have one set of the louvres, for example the inlet louvres as we have shown in Fig. 6, readjusted from the temperature in the condenser so that if the speed of the locomotive provides more cooling air than is necessary the same will be reduced by the closing of this set of louvres. Selector valve 62 allows the operation of the valve 63 by automatic means or manually. The selector valve 62 is of the type disclosed in Patent 2,098,- 914 to H. H. Gorrie, issued November 9, 1937. We also provide such selector valves 62A, 62B, 62C in the air loading lines 32, 60, and 59 enabling the control of louvres 5 and 6 to be selective, that is, manual or automatic.

In the control system just described, it is to be noted that train speed will operate the outlet louvres independently of the condensate or oil temperatures, and in addition train speed will effect, with the resultant loading pressure established by the condensate and oil temperatures, a positioning of the inlet louvres. Thus the control is primarily from train speed and secondarily from the condensate and oil temperatures.

It may be desirable to control the discharge louvres from condensate pressure and oil temperature, and to operate the inlet louvres directly from air speed. It further may be desirable to set the lubricating oil temperature and the condensate pressure controllers so as to create loading pressures only within certain limits, and to allow one of the controllers, for example, the oil temperature controller 72, to respond more quickly than the condensate pressure controller 72A. The control system depicted by Fig. 7 may thus be operated. In this system the air flow meter 64 indicative of the speed of the locomotive, through the positioning of its pointer arm 65, operates an air pilot valve 66 which creates an air loading pressure in piping 67, 68, 69 and this pressure is transmitted to the actuators 70 for directly positioning the inlet louvres 71.

The lubricating oil temperature controller 72 upon reaching a limiting position will cause a different air loading pressure to be established in line 74 by moving air pilot valve 73 which causes a change in the pressure in chamber 75 of relay 80. Such limit control is effected, as shown in Fig. 8, through a lost motion link 53 wherein any movement of controller 72 or 72A may be made not effective to create a loading pressure and such ineffectiveness may be made to correspond to any desirable temperature range by the adjustable limiting screws 54. Since the limit control of lubricating oil temperature is made more narrow than condensate pressure it will predominate in rapidity of action. Pressure changes in chamber 75 will cause a change in chamber 77, which change is transmitted to chamber 83 of relay 81 causing a change in chamber 84, which change is then transmitted to the actuator 85 for positioning outlet louvres 86.

The pressure in chamber 77 is effective through line 87, selector valve 88, upon the valve 89, positioning the valve to admit more steam to the condenser fan engine 7A. This valve will only operate upon a high temperature limit being reached and remains closed at all other conditions. The valve 89 can either be automatically operated or may be set for hand control if so desired through the agency of the selector valve 88.

Figure 7:
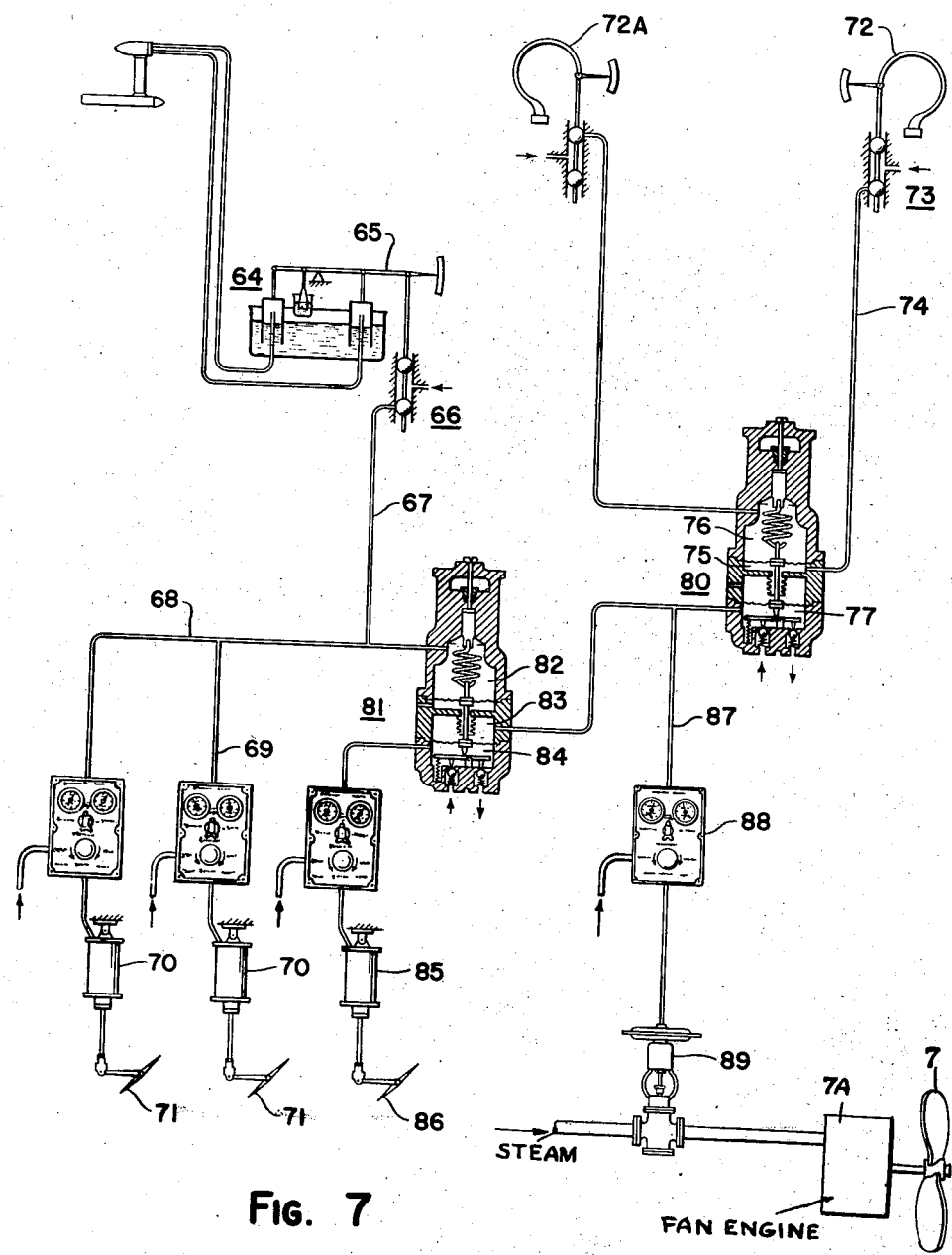
Fig. 7 shows a different arrangement than Fig. 6 but embodying the same elements of the control system.

In Figs. 6 and 7 we have illustrated and then described types of louvre control which are primarily effective from train speed and with modification of the control by the loading pressures from condensate temperature or pressure and lubricating oil temperature. As shown and as may be desired either the inlet or outlet louvres may be controlled without any modification from train speed. However, the louvres are all directly positioned by train speed, some section of them to be later modified by the condensate temperature or pressure and lubricating oil temperature.

While we have herein illustrated and described certain preferred embodiments of our invention, we wish it to be understood that we are not to be limited thereby, but only as to the appended claims in view of prior art.

What we claim as new, and desire to secure by Letters Patent of the United States, is:

1. In a railway vehicle, an apparatus for condensing exhaust vapor from a prime mover and cooling lubricating oil comprising, a heat exchanger, a plurality of louvres in opposite side walls of the vehicle adjacent the heat exchanger, a plurality of louvres in the roof of said vehicle above said heat exchanger, regulators for positioning one of said pluralities of louvres, means sensitive to vehicle speed arranged to establish a control pressure for positioning said regulators, means responsive to a condensate variable, means responsive to lubricating oil temperature, said last two named means adapted to impart adjusting impulses, a relay means algebraically adding said impulses, a second relay receiving said control pressure and the algebraic sum from said first relay, the two pressures acting in the same direction, and said resulting pressure adjustably positioning said regulators operating one set of said louvres.

2. A railway vehicle condensing plant having a set of inlet louvres and a set of outlet louvres and an air cooled surface condenser for condensing exhaust vapor from a prime mover; means for positioning the inlet louvres for passing cooling air around the condenser, means for positioning the outlet louvres for discharging air from around the condenser, means sensitive to the vehicle speed arranged to control said first two named means so that said louvres are opened in proportion to vehicle speed, and means sensitive to the temperature in the condenser adapted to modify the control of one set of louvres in accordance with changes of the temperature in the condenser from a predetermined value.

3. A railway vehicle condensing plant having a set of inlet louvres and a set of outlet louvres and an air cooled surface condenser for condensing exhaust vapor from a prime mover; means for positioning the inlet louvres for passing cooling air around the condenser, means for positioning the outlet louvres for discharging air from around the condenser, means sensitive to the vehicle speed arranged to control said first two named means so that said louvres are opened in proportion to vehicle speed, and means sensitive to the pressure in the condenser adapted to modify the control of one set of louvres in accordance with changes of the pressure in the condenser from a predetermined value.

4. A railway vehicle condensing plant having a set of inlet louvres and a set of outlet louvres and an air cooled surface condenser for condensing exhaust vapor from a prime mover, in combination, means sensitive to the vehicle speed arranged to progressively open at least one of said sets of louvres in proportion to vehicle speed, and means sensitive to the temperature in the condenser adapted to readjust the position of at least one set of louvres in accordance with changes of the temperature in the condenser from a predetermined value.

5. In a railway vehicle condensing plant having an air cooled surface condenser, a set of adjustable inlet louvres for directing air from the surrounding atmosphere around said condenser, a set of adjustable outlet louvres for exhausting air from around the condenser to the surrounding atmosphere, a variable speed fan for propelling the air around the condenser, means responsive to the speed of the vehicle for positioning said louvres, and means responsive to the temperature in said condenser regulating the speed of said fan.

6. In a railway vehicle condensing plant having an air cooled surface condenser, a plurality of adjustable louvres for directing air from the surrounding atmosphere around said condenser, a variable speed fan for propelling the air around the condenser, means responsive to the speed of the vehicle for positioning said louvres, and means responsive to a measure of the temperature in said condenser regulating the speed of said fan.

7. In a railway vehicle condensing plant having an air cooled surface condenser, a set of adjustable inlet louvres for directing air from the surrounding atmosphere around said condenser, a set of adjustable outlet louvres for exhausting air from around the condenser to the surrounding atmosphere, a variable speed fan for propelling the air around the condenser, means responsive to the speed of the vehicle for positioning said inlet louvres, and means jointly responsive to the speed of the vehicle and a measure of the temperature in the condenser for positioning said outlet louvres and controlling the speed of said fan.

8. A railway vehicle condensing plant having inlet and outlet louvres and a heat exchanger for condensing exhaust vapor from a prime mover and cooling lubricating oil, means for positioning the inlet louvres for admitting air to the heat exchanger, means for positioning the outlet louvres for discharging air from the heat exchanger, means sensitive to the vehicle speed arranged to control said first two means, and means sensitive to a variable of the condensate and lubricating oil temperatures adapted to modify the control of one set of louvres from vehicle speed.

9. A railway vehicle condensing plant having inlet and outlet louvres and a heat exchanger for condensing exhaust vapor from a prime mover and cooling lubricating oil, means for positioning the inlet louvres for admitting cooling air to the heat exchanger, means for positioning the outlet louvres for discharging air from the heat exchanger, means sensitive to the vehicle speed arranged to control said first two means, and means sensitive to the condensate temperature and lubricating oil temperature and adapted to modify the control of one set of louvres from vehicle speed.

10. A railway vehicle condensing plant having inlet and outlet louvres and including a heat exchanger for condensing exhaust vapor from a prime mover and cooling lubricating oil, means for positioning the inlet louvres for admitting cooling air to the heat exchanger, means for positioning the outlet louvres for discharging air from the heat exchanger, means sensitive to vehicle speed arranged to control said first two means, and means sensitive to the pressure in the heat exchanger and lubricating oil temperature adapted to modify the control of one set of louvres from vehicle speed.

11. A railway vehicle condensing plant having a set of inlet louvres and a set of outlet louvres and an air cooled surface condenser for condensing exhaust vapor from a prime mover; means for positioning the inlet louvres for passing cooling air around the condenser, means for positioning the outlet louvres for discharging air from around the condenser, means sensitive to the vehicle speed arranged to control said first two named means so that said louvres are progressively opened in proportion to vehicle speed, and means sensitive to a measure of the temperature within the condenser adapted to modify the control of one set of louvres in accordance with changes of the temperature in the condenser from a predetermined value.

PAUL H. KNOWLTON.
PAUL S. DICKEY.

CERTIFICATE OF CORRECTION.

Patent No. 2,261,584. November 4, 1941.

PAUL H. KNOWLTON, ET AL.

Figure 9:
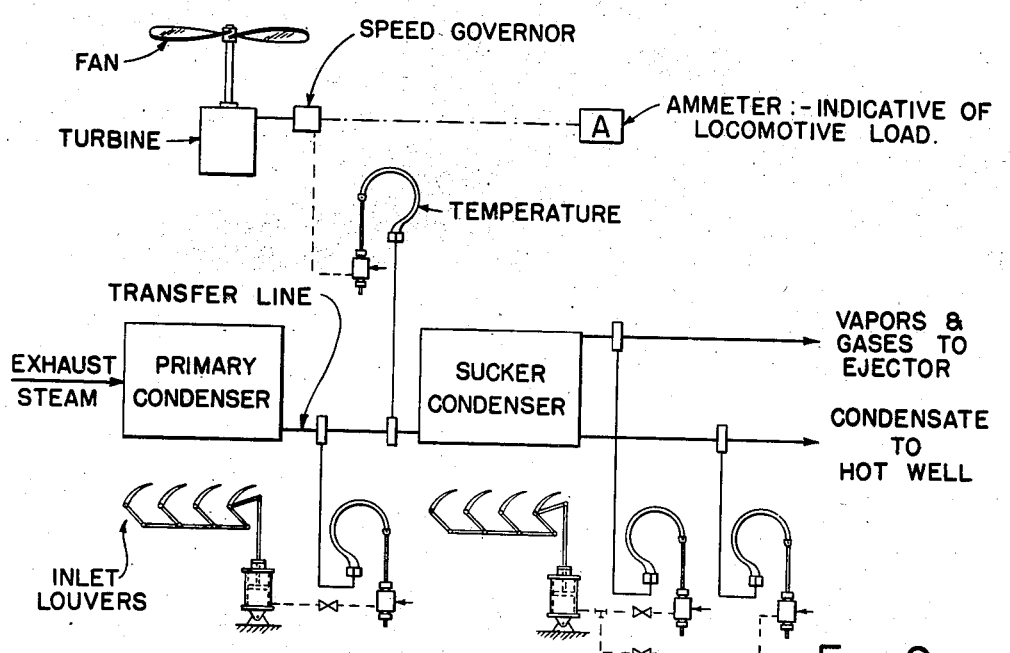
Figure 10:
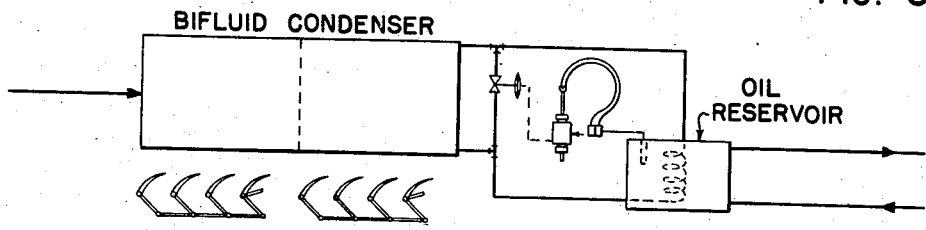
Figure 11:
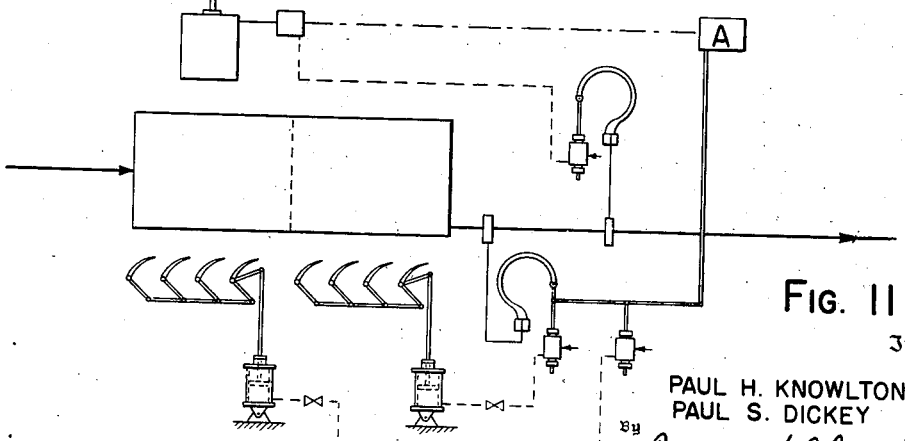

It is hereby certified that error appears in the printed specification of the above numbered patent requiring correction as follows: Page 3, second column, lines 11 and 12, strike out ", located in an auxiliary steam line leading to a condenser fan engine (not shown)"; in the drawings, strike out Sheet 5 thereof, containing Figures 9, 10, and 11; and that the said Letters Patent should be read with this correction therein that the same may conform to the record of the case in the Patent Office.

Signed and sealed this 14th day of April, A. D. 1942.

(Seal)

Henry Van Arsdale,
Acting Commissioner of Patents.